Dec. 25, 1928.

H. C. CHASE 1,696,879

BRAKE FOR VEHICLES

Filed May 25, 1927

2 Sheets-Sheet 1

INVENTOR
Hamilton C. Chase;
BY Nestall and Wallace
ATTORNEYS

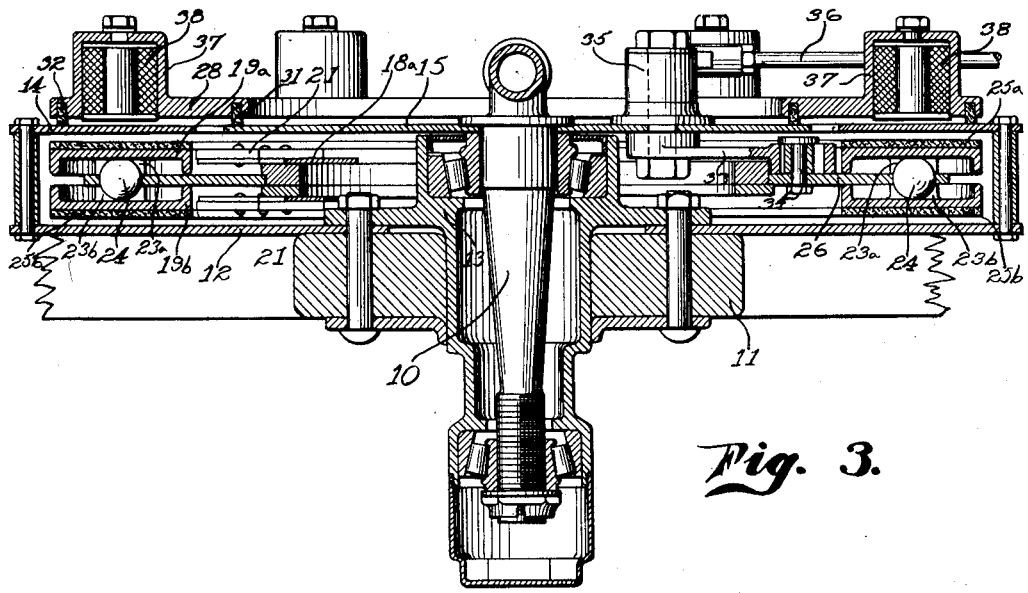

Patented Dec. 25, 1928.

1,696,879

UNITED STATES PATENT OFFICE.

HAMILTON C. CHASE, OF LOS ANGELES, CALIFORNIA, ASSIGNOR OF ONE-HALF TO TOBIAS WEBER, OF LOS ANGELES, CALIFORNIA.

BRAKE FOR VEHICLES.

Application filed May 25, 1927. Serial No. 193,988.

This invention relates to a vehicle brake which employs disks or plates arranged to be moved into frictional contact with one another. The present invention appertains more particularly to a brake of the disk type having an expansible disk member arranged to be spread against adjacent disks or plates. The primary object of this invention is to provide in a brake of the character described an expansible member with novel operating means for spreading the disk or plates. A further object of this invention is to provide operating means which is aided by the travel of the vehicle in setting of the brakes. In addition to the broader objects of this invention, there are certain details of construction whereby simplicity, durability and strength of structure, economy of manufacture and ease of manipulation are obtained.

Figure 1:
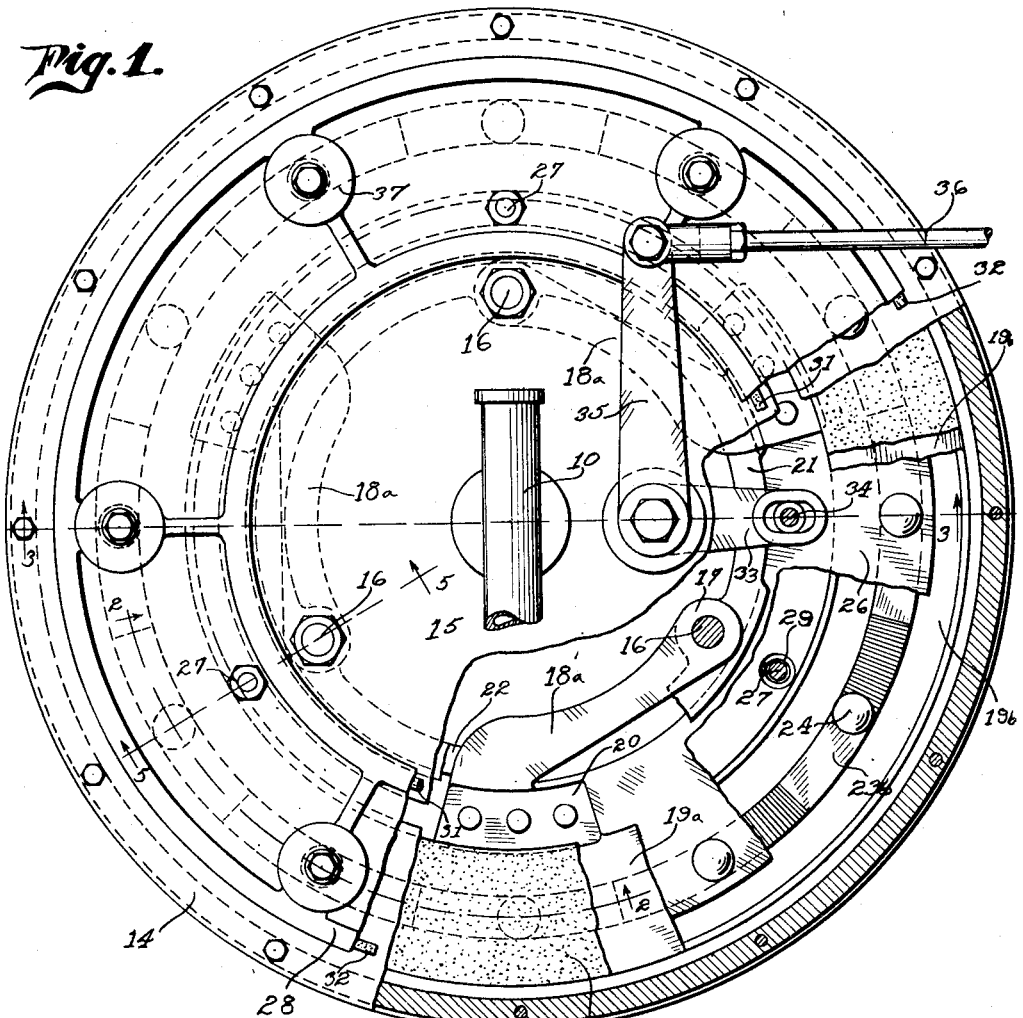
Figure 2:
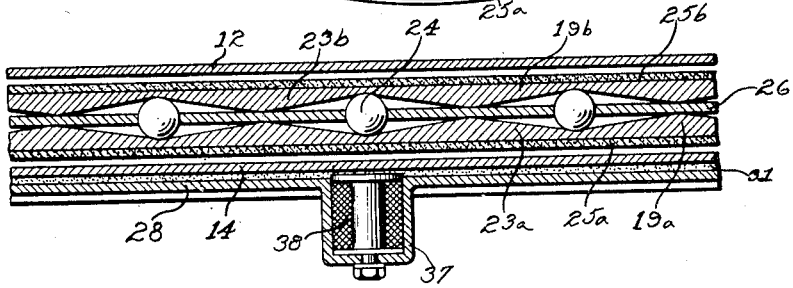

These objects together with other objects and corresponding accomplishments are obtained by means of the embodiment of my invention illustrated in the accompanying drawing, in which:

Fig. 1 is an elevation of a brake as seen looking from the inside of a vehicle wheel, portions being broken away to better illustrate the assembly; Fig. 2 section developed upon the line 2—2 of Fig. 1; Fig. 3 is a section as seen on the line 3—3 of Fig. 1; Fig. 4 is an elevation as seen looking from the inside of the wheel with a wiring diagram of an electrical circuit for controlling the motors being indicated; and Fig. 5 is a section as seen on the line 5—5 of Fig. 1 of a fragment of the brake.

Referring more particularly to the drawing, the brake is shown applied to a wheel mounted upon the spindle of a steering knuckle. However, it will be obvious from the appended description, that it may be applied in various other arrangements. The steering knuckle with its spindle is indicated generally by 10 and mounted thereon is a wheel indicated by 11, a fragment of the wheel being shown in Fig. 3. Secured to the wheel 11 so as to be rotated therewith is a plate or disk 12. This plate may be secured to the wheel hub by suitable bolts. Secured to and spaced from the plate 12 by means of bolts and spacer bushings is a plate or ring 14. In this manner a disk unit is provided. The plates 12 and 14 form a channel to receive an expansible working unit.

Secured to the knuckle against rotation is a torque plate 15. This plate is stationary with respect to the wheel and serves for attaching thereto the anchor unit. Mounted on the torque plate are three bolts 16. Mounted over each bolt and resting against the torque plate is a spacing washer 17. Disposed over the shank of each bolt and resting against a washer is a resilient arm 18$^a$ there being one for each bolt. These arms are preferably of spring steel, and are best illustrated in Fig. 1. A ring of channel form indicated by 19$^a$ has ears 20, a spring finger being secured to each ear by means of rivets or other suitable means. The ring 19$^a$ is resiliently supported thus against lateral movement. Mounted upon the bolts is a step ring 21 having a groove in its outer surface. Mounted against the step ring 21 is a spacer ring 22. The spacer ring 22 in cooperation with the step ring forms a hub with a channel in its periphery for the ball plate later described. Mounted upon each bolt 16 is a spring finger 18$^b$ corresponding to spring fingers 18$^a$. Attached to spring fingers 18$^b$ is a channel ring 19$^b$ corresponding to ring 19$^a$ and disposed with their channels confronting. In the channels and preferably integral with the webs are runways 23$^a$ and 23$^b$. The runways have surfaces which are corrugated so as to provide pockets for balls 24. The outer faces of the rings are preferably lined or covered with wear material 25$^a$ and 25$^b$, such as brake lining.

Rotatably mounted on the hub formed by the step ring 21 and the spacer ring 22 is a plate 26 having openings therein for the balls 24. Plate 26 extends between the channel rings forming a cage for the balls 24 controlling the travel of the latter. It would be free to rotate, but is prevented by reason of the balls which can only be moved a limited distance as they must crowd the channel rings away from one another in order to have movement. The channel rings may be spread by crowding the balls, and this is accomplished by turning the restraining plate 26. This may be performed manually or by the wheel rotation. To this end, bolts 27 are attached to plate 26. An operating ring 28 is slidably mounted upon the bolts and held resiliently from the plate 26 by means of compression springs 29. Soft felt packing rings 31 and 32 are disposed on the inner face of ring 28.

Pivotally mounted upon the torque plate 15 is a bell crank lever having an arm 33 slotted at the end to receive a pin 34. Pin 34 is secured to the plate 26. Thus, upon turning of the bell crank arm, plate 26 will be turned and the balls 24 may be crowded in the runways between the channel rings. The other arm 35 of the bell crank has link 36 secured thereto and is attached to operating mechanism convenient for manipulation by the operator of the vehicle. A pull upon the link 36 will turn the bell crank lever. This will cause the plate 26 to be rotated and turn with it the balls 24. The balls will crowd the rings 19$^a$ and 19$^b$ away from one another, spreading them into contact with the plates 12 and 14. The rings 19$^a$ and 19$^b$ are held stationary and thereby exert a frictional drag upon the plates 12 and 14 producing a braking effect.

The operating ring 28 is formed with housings 37. These housings are herein shown as six in number and each serves as a case for an electromagnet. Each electromagnet 38 has a core arranged to act with the plate 14 as an armature. Upon energization of the electromagnets, attraction will be exerted between their cores and plate 14, tending to pull the ring 28 and plate 14 into contact. There will be a magnetic drag upon the plate 14 which rotates with respect to the operating ring. Furthermore, the compression springs 29 permit the operating ring 28 to move toward the plate 14 and engage the latter the felt rings 31 and 32 being contracted. The pull upon the ring 28 created by either frictional contact with plate 14, magnetic drag or by both, will cause the operating ring to be rotated a limited distance carrying with it the plate 26 and crowding the balls 24 between the channel rings. This causes the latter to be spread and a braking effect produced. Obviously the braking effect is dependent upon the rotation of the vehicle wheel. The spring fingers 18$^a$ and 18$^b$ tend to move rings 19$^a$ and 19$^b$ toward each other. The surfaces of the pockets are inclined and press upon the balls. Release of the plate 26 will permit the rings to return to their inner position by reason of the tension of the spring fingers and the position of the balls on the pocket surfaces. In Fig. 4, I have shown diagrammatically a simplified circuit for energizing the electromagnets. A source of electrical energy, which may be a battery 39 has the electromagnets connected in parallel therewith. A variable rheostat 40 is connected to one terminal of the battery. The energization of the electromagnets may be controlled by operation of the rheostat.

What I claim is:

1. A brake comprising a rotatable element, confronting friction plates normally spaced from one another and mounted to be moved into frictional engagement, one of said plates being secured to said element so as to be rotated therewith, the other of said plates being stationary, means to urge said plates into frictional engagement including a runway having inclined planes, rolling elements mounted on said runway to travel over said planes, restraining means controlling travel of said rolling elements, operating means for actuating said restraining means so as to cause said rolling elements to travel comprising electromagnetic means for coupling said operating means to the rotatable plate whereby to urge said operating means to travel therewith.

2. A brake comprising a rotatable element, a disk member secured to be rotated therewith, an anchor member secured against rotation and movable laterally into frictional engagement with said disk member, and means to urge said working member against said disk member including runways having inclined planes, rolling elements mounted on said runways so as to travel on said planes, a cage for said rolling elements arranged to control the travel over said planes, and compel movement of said runways upon said rolling elements travelling over said planes, and electromagnetic means for coupling said cage to the rotatable disk member whereby to urge said cage to travel with said rotatable element.

3. A brake comprising a rotatable element, a disk unit having spaced friction plates attached to said element so as to be rotated therewith, an expansible anchor unit disposed intermediate said plates and including spaced friction members confronting said plates, means intermediate said members for spreading the latter into frictional engagement with said plates including a runway having inclined planes, rolling elements mounted on said runways to travel over said planes, restraining means controlling travel of said rolling elements, operating means for actuating said restraining means so as to cause said rolling elements to travel comprising means for urging said operating means to travel with said rotatable element.

4. A brake comprising a rotatable element, a disk unit having spaced friction plates attached to said element so as to be rotated therewith, an expansible anchor unit disposed intermediate said plates and including spaced friction members confronting said plates, means intermediate said members for spreading the latter into frictional engagement with said plates including a runway having inclined planes, rolling elements mounted on said runway to travel over said planes, restraining means controlling travel of said rolling elements, operating means for actuating said restraining means so as to cause said rolling elements to travel comprising electromagnetic means for coupling said restraining means to said friction plates whereby to urge said operating means to travel therewith.

5. A brake comprising a rotatable element, a disk unit having spaced friction plates secured to said element so as to be rotated therewith, an expansible anchor unit disposed intermediate said plates and including spaced friction members confronting said plates, means intermediate said members for spreading the latter into frictional engagement with said plates including a runway having inclined planes, rolling elements mounted on said runway so as to travel over said planes, restraining means controlling travel of said rolling elements comprising a disk cage, and coupling means for actuating said cage so as to compel travel of said rolling elements comprising means for urging said cage to travel with said rotatable element.

6. A brake comprising a rotatable element, a disk unit having spaced friction plates secured to said element so as to be rotated therewith an expansible working anchor unit disposed intermediate said plates and including spaced friction members confronting said plates, means intermediate said members for spreading the latter into frictional engagement with said plates including a runway having inclined planes, rolling elements mounted on said runway so as to travel over said planes, restraining means controlling travel of said rolling element comprising a disk cage, and coupling means for actuating said cage so as to compel travel of said rolling elements comprising means for urging said cage to travel with said rotatable element.

7. A brake comprising a rotatable element, a disk unit having spaced friction plates secured to said element so as to be rotated therewith, an expansible unit disposed intermediate said plates and including spaced friction members confronting said plates, means intermediate said members for spreading the latter into frictional engagement with said plates including a runway having inclined planes, rolling elements, a cage for said rolling elements arranged to control their travel on said planes, and electromagnetic means for coupling said cage to said disk unit whereby to urge said cage to travel with said rotatable element.

8. A brake comprising a rotatable element, a disk unit secured to said rotatable element and having spaced friction plates, an expansible anchor unit disposed intermediate said plates and including spaced friction members confronting said plates, rails on the confronting faces of said friction members having inclined planes to form pockets, balls in said pockets, a cage disk for said balls arranged to control their travel over said planes, and coupling means for actuating said cage so as to compel travel of said balls comprising means for urging said cage disk to travel with said rotatable element.

9. In combination with a wheel, a disk unit having spaced friction plates secured to said wheel so as to be rotated therewith, an expansible anchor unit disposed intermediate said plates and including spaced friction members confronting said plates, means intermediate said members for spreading the latter into frictional engagement with said plates including rails having inclined confronting faces forming pockets, balls disposed between said rails in said pockets, a cage disk for said balls arranged to control travel over said plane, a ring secured to said cage disk and confronting a friction plate, and electromagnets mounted on said ring operable to create a drag upon a friction plate, whereby to actuate said disk cage and cause said balls to travel along said rails and thereby spread said friction members.

In witness that I claim the foregoing I have hereunto subscribed my name this 12th day of May, 1927.

HAMILTON C. CHASE.